Aug. 29, 1961 W. N. STONE ET AL 2,997,863
SHAFT COUPLING
Filed Nov. 24, 1959
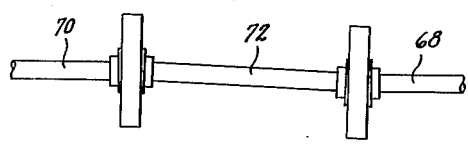
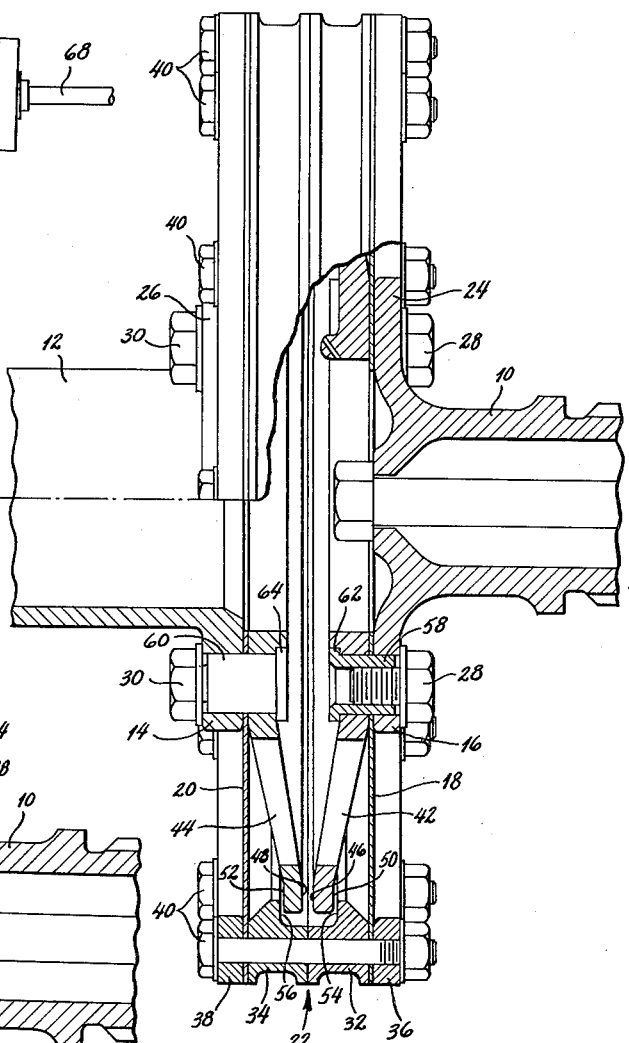
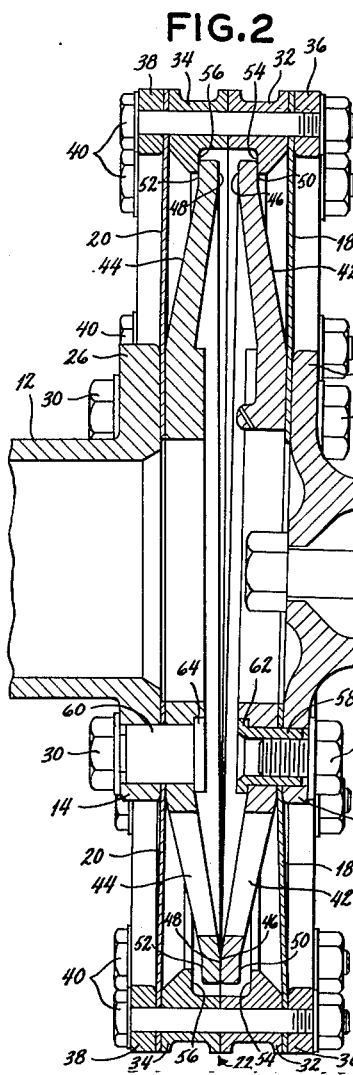
INVENTORS
WALTER N. STONE
NELSON R. RICHMOND
BY
ATTORNEYS United States Patent Office 2,997,863
Patented Aug. 29, 1961

2,997,863
SHAFT COUPLING
Walter N. Stone, Bloomfield, and Nelson R. Richmond, Thompsonville, Conn., assignors to The Kaman Aircraft Corporation, Bloomfield, Conn., a corporation of Connecticut
Filed Nov. 24, 1959, Ser. No. 855,174
17 Claims. (Cl. 64—13)

The invention relates to a shaft coupling and more particularly to a flexible coupling for transmitting power from one to the other of two rotatable shafts which are at least approximately in alignment but which are subject to angular misalignment. The term "angular misalignment" is herein used to refer to a condition wherein the axes of the two shafts intersect each other with a small angle between them.

A power transmitting connection of the type to which the invention relates is adapted to function with the shafts angularly misaligned to a limited extent without impairing the torque transmitting capacity. But such a connection may be so constructed that it fails to function properly when the angle of misalignment exceeds a predetermined amount.

One object of the invention is to provide a flexible coupling adapted for transmitting power from one to the other of two rotatable shafts which are normally in approximate alignment but subject to angular misalignment and having positive means for limiting the magnitude of the misalignment, said misalignment limiting means being self-contained and not dependent on shaft bearings or other parts for limiting the misalignment.

Another object of the invention is to provide two flexible couplings between two normally aligned main shafts and an interposed connecting shaft, said couplings serving to limit axial misalignment of the main shafts. The term "axial misalignment" is herein used to refer to a condition wherein the axes of the two shafts are parallel or substantially so, but are out of register with each other. The couplings between the main shafts and the connecting shaft limit angular misalignment at predetermined equal angles with the result that axial misalignment of said main shafts in parallelism is definitely limited.

Further objects of the invention are to provide various details of construction and arrangement whereby the foregoing more general object is obtained.

The drawing shows a preferred embodiment of the invention and such embodiment will be described, but it will be understood that various changes may be made from the construction disclosed and that the drawings and description are not to be construed as defining or limiting the scope of the invention, the claims forming a part of this specification being relied upon for that purpose.

Of the drawing:

FIG. 1 is a plan view partly in section showing a flexible coupling embodying the invention, the positions of the various parts being those corresponding to exact alignment of the shafts.

FIG. 2 is a view similar to that of FIG. 1, but showing the various parts in the positions corresponding to the maximum angular misalignment of the shafts.

FIG. 3 is a plan view on a reduced scale showing the use of two couplings and an intermediate shaft when the main shafts are subject to axial misalignment.

Referring first to FIG. 1, there are shown two rotatable shafts 10, 12 in end-to-end relationship with their axes normally in alignment. However, the shafts may be subject to angular misalignment during the transmission of power from one to the other. Either shaft may be the driving shaft, but for convenience of description it will be assumed that the shaft 10 is the driving shaft.

The before-mentioned flexible power transmitting connection between the shafts may vary as to details, but preferably and as shown, it includes a suitable means connectible with the two shafts and constructed to transmit power from one shaft to the other and to permit limited angular misalignment of said shafts. Said connection also includes a misalignment limiting means which positively limits angular misalignment of the shafts beyond a predetermined extent.

Stated more specifically, the power transmitting means preferably includes two similar thin flexible circular diaphragms 18 and 20 having their inner portions connected to the respective shafts 10 and 12. The diaphragms are preferably connected with the shafts by means of attachment members 14 and 16 rigidly connected with the respective shafts. The diaphragms 18 and 20 are substantially parallel with each other, and an annular means 22 is fixedly connected with the outer portions of the diaphragms and provides a connection between them. Power may be transmitted from the shaft 10 to the attachment member 14, to the diaphragm 18, to the connecting means 22, to the diaphragm 20, to the attachment member 16, and finally to the shaft 12. The diaphragms 18 and 20 are sufficiently flexible to permit limited angular misalignment of the shafts 10 and 12 without impairing the torque transmitting capacity.

As to specific details of construction, the attachment members 14 and 16 are shown as being integral with the shafts, but this is not essential. The attachment members include generally similar circular flanges 24 and 26 to which the diaphragms 18 and 20 are respectively connected by bolts 28, 28 and 30, 30. The connecting means 22 comprises two companion rings 32 and 34 which are between the diaphragms, and said connecting means also comprises rings 36 and 38 at the opposite outer faces of the diaphragms. Bolts 40, 40 extend through holes in the diaphragms 18 and 20 and through holes in the rings 32, 34 and through holes in the rings 36 and 38 to complete the connecting means 22 and to hold all parts thereof in fixed relationship.

The before-mentioned misalignment limiting means preferably includes two similar rigid first and second discs 42 and 44 which are fixedly secured respectively to the shafts 10 and 12 and they are shown as being so secured by means of the attachment members 14 and 16. The discs are shown as being adjacent the diaphragms 18 and 20. Rotatable means adjacent the peripheries of the discs serve upon angular misalignment of the shafts for causing said discs to limit said angular misalignment.

Said rotatable means include parts that act simultaneously upon said discs at diametrically opposite positions when there is a predetermined angular misalignment of said shafts and thereby serve to positively limit such misalignment.

Preferably and as shown, said rotatable means for limiting angular misalignment includes annular substantially planar inner surfaces 46 and 48 on the discs 42 and 44. These annular surfaces are near the peripheries of the discs and they face toward each other and are perpendicular to the axes of the respective attachment members. The said surfaces are spaced from each other when the shafts are in alignment and they are adapted upon angular misalignment of the shafts to tend to limit said misalignment by rolling contact with each other.

Said rotatable means for limiting angular misalignment also includes other annular substantially planar outer surfaces 50 and 52 on the discs 42 and 44. These last said surfaces are also near the peripheries of the discs but they face away from each other. They are also perpendicular to the axes of the respective attachment members. For cooperation with the surfaces 50 and 52 a rotatable annular member is provided having two annular surfaces 54 and 56 in fixed relation with each other and facing toward each other which last said surfaces are equally spaced respectively from the surfaces on the discs when the shafts are in alignment. Preferably the annular member is carried by the diaphragms 18 and 20, and as illustrated the before-described rings 32 and 34 collectively constitute said member. The rings 32 and 34 have the surfaces 54 and 56 respectively thereon. The diameter of the annular member is so related to the diameter of the discs that said annular surfaces 50 and 52 on the discs are adapted upon angular misalignment of the shafts to tend to limit such misalignment by rolling contact with the surfaces 54 and 56 on the annular member.

The rolling contact of the surfaces 46 and 48 with each other occurs at the same angle of misalignment as the rolling contact of the surfaces 50 and 52 with the surfaces 54 and 56 of the annular member. The two rolling contacts are at diametrically opposite positions as shown in FIG. 2. The two angle limiting actions are simultaneous and they cooperate to positively limit angular misalignment. The angle limiting action is effected solely by the discs and their associated parts and is not dependent upon shaft bearings or the like.

Otherwise stated, the first disc 42 has first and second annular surfaces 46 and 50 located near its periphery. The second disc 44 has an annular surface 48 which is engageable in rolling contact with the first annular surface 46 on the first disc 42 as the result of a predetermined angular misalignment of the shafts. The annular member is rotatable with the second disc 44 and it has an annular surface 54 which is engageable in rolling contact with the second annular surface 50 on the first disc as the result of the same predetermined misalignment of the shafts. The first said rolling contact and the second said rolling contact at diametrically opposite positions cooperate to positively limit angular misalignment.

Preferably, the angle limiting discs 42 and 44 are between the diaphragms 18 and 20. When the discs are so located, the discs and the diaphragms may be connected to the flanges 24 and 26 by the same means. As shown, the discs and the diaphragms are secured to the flanges 24 and 26 by the before-mentioned bolts 28 and 30. These bolts engage internally threaded nutlike members 58 and 60 which extend through and fit holes in the discs 42, 44 and in the diaphragms 18, 20 and in the flanges 24, 26. The members 58 and 60 have flanges 62, 64 that engage the discs.

When the shafts are subject to axial misalignment, the arrangement shown in FIG. 3 may be provided. As shown, there are two main shafts 68 and 70 that are longitudinally spaced from each other and axially misaligned. A short connecting shaft 72 is interposed between the shafts 68 and 70. Two flexible couplings, such as shown in detail in FIGS. 1 and 2, are connected respectively between the attachment member for one main shaft and one end of the connecting shaft and between attachment member for the other main shaft and the opposite end of the connecting shaft. The flexible couplings permit limited angular misalignment of each main shaft with respect to the connecting shaft. The axial misalignment of the two main shafts is made possible by the two angular misalignments of the main shafts with the connecting shafts. The couplings positively limit the angular misalignments at predetermined and equal angles and this results in definitely limiting the axial misalignment.

The invention claimed is:

1. A flexible coupling for two rotatable shafts having their axes normally in approximate alignment with each other but subject to limited angular misalignment, said coupling comprising in combination: means connectible with the two shafts and constructed to transmit power from one shaft to the other and to permit limited angular misalignment of said shafts, first and second closely adjacent discs rigidly connectible respectively with said shafts, and rotatable means acting simultaneously upon said discs at diametrically opposite positions when there is a predetermined angular misalignment of said shafts and thereby serving to positively limit such misalignment.

2. A flexible coupling as set forth in claim 1, wherein the last said means includes a rotatable annular member separate from the discs and concentric therewith which member upon said misalignment is simultaneously engageable directly with both discs in at least one of said opposite positions.

3. A flexible coupling for two rotatable shafts having their axes normally in approximate alignment with each other but subject to limited angular misalignment, said coupling comprising in combination: means connectible with the two shafts and constructed to transmit power from one shaft to the other and to permit limited angular misalignment of said shafts, a first disc rigidly connectible with one of said shafts and having first and second annular surfaces located near its periphery, a second disc rigidly connectible with the other of said shafts and having an annular surface which is engageable in rolling contact with the first annular surface on the first disc as the result of a predetermined angular misalignment of the shafts, and means rotatable with the second disc and having an annular surface engageable in diametrically opposite rolling contact with said second annular surface on the first disc as the result of the same predetermined angular misalignment of the shafts, the last said means cooperating with said annular surface on the second disc to positively limit said angular misalignment.

4. A flexible coupling as set forth in claim 3, wherein said first and second annular surfaces on the first disc are at opposite sides thereof and are approximately parallel with each other, and wherein the annular surface on the second disc and the annular surface on said rotatable means are parallel with said annular surfaces on the first disc.

5. A flexible coupling as set forth in claim 4, wherein all of said annular surfaces are approximately perpendicular to the axis of rotation.

6. A flexible coupling for two rotatable shafts having their axes normally in approximate alignment but subject to angular misalignment, said coupling comprising in combination: a flexible connection between the shafts constructed to transmit power from one to the other and to permit limited angular misalignment of said shafts, two similar rigid discs fixedly connectible respectively to said shafts and located closely adjacent each other when so connected, said discs respectively having annular substantially planar surfaces near their peripheries which surfaces face away from each other and are substantially perpendicular to the axes of the respective shafts, and a rotatable annular member separate from said discs and having two substantially planar surfaces in fixed relation with each other and facing toward each other which last said surfaces are adapted upon angular misalignment of the shafts to limit such misalignment by rolling contact with said surfaces on the annular member.

7. A flexible coupling as set forth in claim 6, wherein two attachment members are provided which are rigidly connectible respectively with said shafts, wherein said flexible connection is connected between said shafts, and wherein said discs are rigidly connected with said shafts.

8. A flexible coupling for two rotatable shafts having their axes normally in approximate alignment but subject to angular misalignment, said coupling comprising in combination: a flexible connection between the shafts constructed to transmit power from one shaft to the other and to permit limited angular misalignment of said shafts, two similar rigid discs fixedly connectible respectively to said shafts and located closely adjacent each other when so connected, said discs respectively having inner annular substantially planar surfaces which face toward each other and also having outer annular substantially planar surfaces which face away from each other all of which surfaces are near the peripheries of the discs and are perpendicular to the axes of the respective shafts, and a rotatable annular member separate from the discs and having two substantially planar surfaces in fixed relation with each other and facing toward each other, said inner annular surfaces on the discs being spaced from each other when the shafts are in alignment and said outer annular surfaces on the discs being spaced from said surfaces on the annular member when the shafts are in alignment so that upon angular misalignment of the shafts said misalignment is limited by the rolling contact with each other of said inner surfaces on the discs and by the simultaneous rolling contact of said outer surfaces on the discs with said surfaces on the annular member.

9. A flexible coupling as set forth in claim 8, wherein two attachment members are provided which are rigidly connectible respectively with said shafts, wherein said flexible connection is connected between said shafts, and wherein said discs are rigidly connected with said shafts.

10. A flexible coupling comprising in combination, two attachment members rigidly connectible respectively to two rotatable shafts having their axes normally in approximate alignment but subject to angular misalignment, two thin flexible circular diaphragms fixedly secured respectively to said attachment members which diaphragms are axially spaced from each other and are parallel when the shafts are in alignment, means at the peripheries of the diaphragms for connecting them with each other to enable them to transmit power from one attachment member to the other and to permit angular misalignment of said shafts during power transmission, two similar rigid discs fixedly secured respectively to said attachment members adjacent the diaphragms, and rotatable means acting simultaneously upon said discs at diametrically opposite positions when there is a predetermined angular misalignment of said shafts and thereby serving to positively limit such misalignment.

11. A flexible coupling comprising in combination, two attachment members rigidly connectible respectively to two rotatable shafts having their axes normally in approximate alignment but subject to angular misalignment, two thin flexible circular diaphragms fixedly secured respectively to said attachment members which diaphragms are axially spaced from each other and are parallel when the shafts are in alignment, means at the peripheries of the diaphragms for connecting them with each other to enable them to transmit power from one attachment member to the other and to permit angular misalignment of said shafts during power transmission, two similar rigid discs fixedly secured respectively to said attachment members adjacent the diaphragms and having inner annular substantially planar surfaces which face toward each other and also having outer annular substantially planar surfaces which face away from each other all of which surfaces are near the peripheries of the discs and are substantially perpendicular to the axes of the respective shafts, and a rotatable annular member having two substantially planar surfaces in fixed relation with each other and facing toward each other, said inner annular surfaces on the discs being spaced from each other when the shafts are in alignment and said outer annular surfaces on the discs being spaced from said surfaces on the annular member when the shafts are in alignment so that upon angular misalignment of the shafts said misalignment is limited by the rolling contact with each other of said inner surfaces on the discs and by the simultaneous rolling contact of said outer surfaces on the discs with said surfaces on the annular member.

12. A flexible coupling as set forth in claim 11, wherein said rotatable annular member is carried by and rotatable with said diaphragms near the peripheries thereof.

13. A flexible coupling comprising in combination, two attachment members rigidly connectible respectively to two rotatable shafts having their axes normally in approximate alignment but subject to angular misalignment, two thin flexible circular diaphragms fixedly secured respectively to said attachment members which diaphragms are axially spaced from each other and are parallel when the shafts are in alignment, means at the peripheries of the diaphragms for connecting them with each other to enable them to transmit power from one attachment member to the other and to permit angular misalignment of said shafts during power transmission, and two similar rigid discs fixedly secured respectively to said attachment members between the diaphragms, and rotatable means acting simultaneously upon said discs at diametrically opposite positions when there is a predetermined angular misalignment of said shafts and thereby serving to positively limit such misalignment.

14. A flexible coupling comprising in combination, two attachment members rigidly connectible respectively to two rotatable shafts having their axes normally in approximate alignment but subject to angular misalignment, two thin flexible circular diaphragms fixedly secured respectively to said attachment members which diaphragms are axially spaced from each other and are parallel when the shafts are in alignment, means at the peripheries of the diaphragms for connecting them with each other to enable them to transmit power from one shaft to the other and to permit angular misalignment of said shafts during power transmission, two similar rigid discs fixedly secured respectively to said attachment members between the diaphragms and having inner annular substantially planar surfaces which face toward each other and also having outer annular substantially planar surfaces which face away from each other all of which surfaces are near the peripheries of the discs and are perpendicular to the axes of the respective attachment members, and a rotatable annular member carried by the diaphragms near the peripheries thereof and having two substantially planar surfaces in fixed relation with each other and facing toward each other, said inner annular surfaces on the discs being spaced from each other when the shafts are in alignment and said outer annular surfaces on the discs being spaced from said surfaces on the annular member when the shafts are in alignment so that upon angular misalignment of the shafts said misalignment is limited by the rolling contact with each other of said inner surfaces on the discs and by the simultaneous rolling contact of said outer surfaces on the discs with said surfaces on the annular member.

15. A flexible coupling as set forth in claim 14, wherein the attachment members are respectively provided with parallel radial flanges, and wherein the two diaphragms and the two discs are respectively connected directly with said flanges.

16. A power transmitting assembly comprising in combination, two attachment members rigidly connectible respectively to two main longitudinally spaced rotatable shafts having their axes normally in alignment but subject to axial misalignment approximately in parallelism, a short connecting shaft interposed between said main shafts, two means connectible respectively between the ends of the two main shafts and the ends of the connecting shaft and constructed to transmit power from one to the other of each two adjacent shafts and to permit limited angular misalignment of said two adjacent shafts, and two similar angular misalignment limiting means carried respectively by the two main shafts and by the corresponding end portions of the connecting shaft, said two misalignment limiting means being constructed and arranged to positively limit angular misalignment of their respective shafts at predetermined equal angles with the result that axial misalignment of said main shafts in parallelism is definitely limited.

17. A power transmitting assembly as set forth in claim 16, wherein each misalignment limiting means includes first and second discs rigidly connected respectively to the corresponding main shaft and the adjacent end of the connecting shaft and also includes means acting simultaneously upon said discs at diametrically opposite positions when there is a predetermined angular misalignment of the corresponding shafts and thereby serving to positively limit such misalignment.

References Cited in the file of this patent

UNITED STATES PATENTS

| | | |
|---|---|---|
| 925,731 | Thomson et al. | June 22, 1909 |
| 1,233,954 | Alquist | July 17, 1917 |
| 2,846,857 | Hagenlocher | Aug. 12, 1958 |

FOREIGN PATENTS

| | | |
|---|---|---|
| 188,066 | Great Britain | Oct. 30, 1922 |